United States Patent
Kuo et al.

(10) Patent No.: US 8,836,872 B2
(45) Date of Patent: Sep. 16, 2014

(54) SWITCHABLE THREE-DIMENSIONAL DISPLAY

(75) Inventors: Ya-Ling Kuo, Taoyuan County (TW); Yung-Sheng Tsai, Hsinchu County (TW); Shih-Lun Lai, Hsinchu County (TW); Chih-Hao Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 299 days.

(21) Appl. No.: 13/214,225

(22) Filed: Aug. 21, 2011

(65) Prior Publication Data

US 2012/0293759 A1 Nov. 22, 2012

(30) Foreign Application Priority Data

May 18, 2011 (TW) .................................. 100117426

(51) Int. Cl.
 G02F 1/1335 (2006.01)
 G02F 1/1343 (2006.01)
 G02B 27/22 (2006.01)
(52) U.S. Cl.
 CPC ...... *G02B 27/2214* (2013.01); *G02F 1/134309* (2013.01)
 USPC .............................................. 349/15; 349/139
(58) Field of Classification Search
 USPC .......................................... 349/15, 139, 141
 See application file for complete search history.

(56) References Cited

U.S. PATENT DOCUMENTS

| | | | |
|---|---|---|---|
| 5,969,850 A | 10/1999 | Harrold et al. | |
| 6,507,383 B1 * | 1/2003 | Abe et al. | 349/141 |
| 7,453,529 B2 * | 11/2008 | Nam et al. | 349/15 |
| 7,825,999 B2 | 11/2010 | Chestak et al. | |
| 7,961,260 B2 * | 6/2011 | Huang et al. | 349/15 |
| 8,395,572 B2 | 3/2013 | Kim et al. | |
| 8,547,488 B2 * | 10/2013 | Kim et al. | 349/15 |
| 2008/0218459 A1 * | 9/2008 | Kim et al. | 345/87 |
| 2008/0266387 A1 | 10/2008 | Krijn et al. | |
| 2010/0182291 A1 | 7/2010 | Kim et al. | |
| 2011/0285953 A1 * | 11/2011 | Liu et al. | 349/141 |

FOREIGN PATENT DOCUMENTS

CN 101782695 7/2010

OTHER PUBLICATIONS

"Office Action of Taiwan Counterpart Application", issued on Oct. 11, 2013, p1-p6, in which the listed reference (CN101782695) was cited.

* cited by examiner

*Primary Examiner* — Edward Glick
*Assistant Examiner* — David Chung
(74) *Attorney, Agent, or Firm* — Jianq Chyun IP Office (57) ABSTRACT

A switchable three-dimensional (3D) display includes a display device and a switchable parallax barrier that is disposed on the display device. The switchable parallax barrier includes a first electrode structure, a second electrode structure, and a liquid crystal layer. The liquid crystal layer is located between the first electrode structure and the second electrode structure. The first electrode structure includes a planar electrode, a plurality of first bar electrodes electrically connected to one another, and an insulating layer. A partial region of the planar electrode is not covered by the first bar electrodes. The insulating layer is disposed between the planar electrode and the first bar electrodes, so that the planar electrode is electrically insulated from the first bar electrodes.

18 Claims, 6 Drawing Sheets

SWITCHABLE THREE-DIMENSIONAL DISPLAY

CROSS-REFERENCE TO RELATED APPLICATION

This application claims the priority benefit of Taiwan application serial no. 100117426, filed on May 18, 2011. The entirety of the above-mentioned patent application is hereby incorporated by reference herein and made a part of this specification.

BACKGROUND

1. Technical Field

The disclosure relates to a three-dimensional (3D) display. More particularly, the invention relates to a switchable 3D display.

2. Description of Related Art

In recent years, as display technology advances, users have become more and more demanding on display quality of displays, e.g., image resolution, color saturation, and so forth. However, other than the requirements for high resolution and high color saturation, in order to satisfy the need of the users to view realistic images, displays which are capable of displaying 3D images have been developed. Additionally, displays with the touch-sensing functions have gain popularity among users.

In the current 3D image display technologies, a parallax barrier controlling images captured in respective eyes of a viewer is configured between a display panel and the viewer. According to visual characteristics of human eyes, a 3D image is produced when two images with the same content but different parallax are respectively captured by a viewer's left and right eyes. Said parallax barrier often has a plurality of slits that allow the viewer to see different images respectively from his or her left eye and right eye. Since the conventional parallax barrier prevents the 3D display from displaying normal two-dimensional (2D) images, a switchable parallax barrier has been proposed to display both the 2D and the 3D images on the display.

Figure 1A:
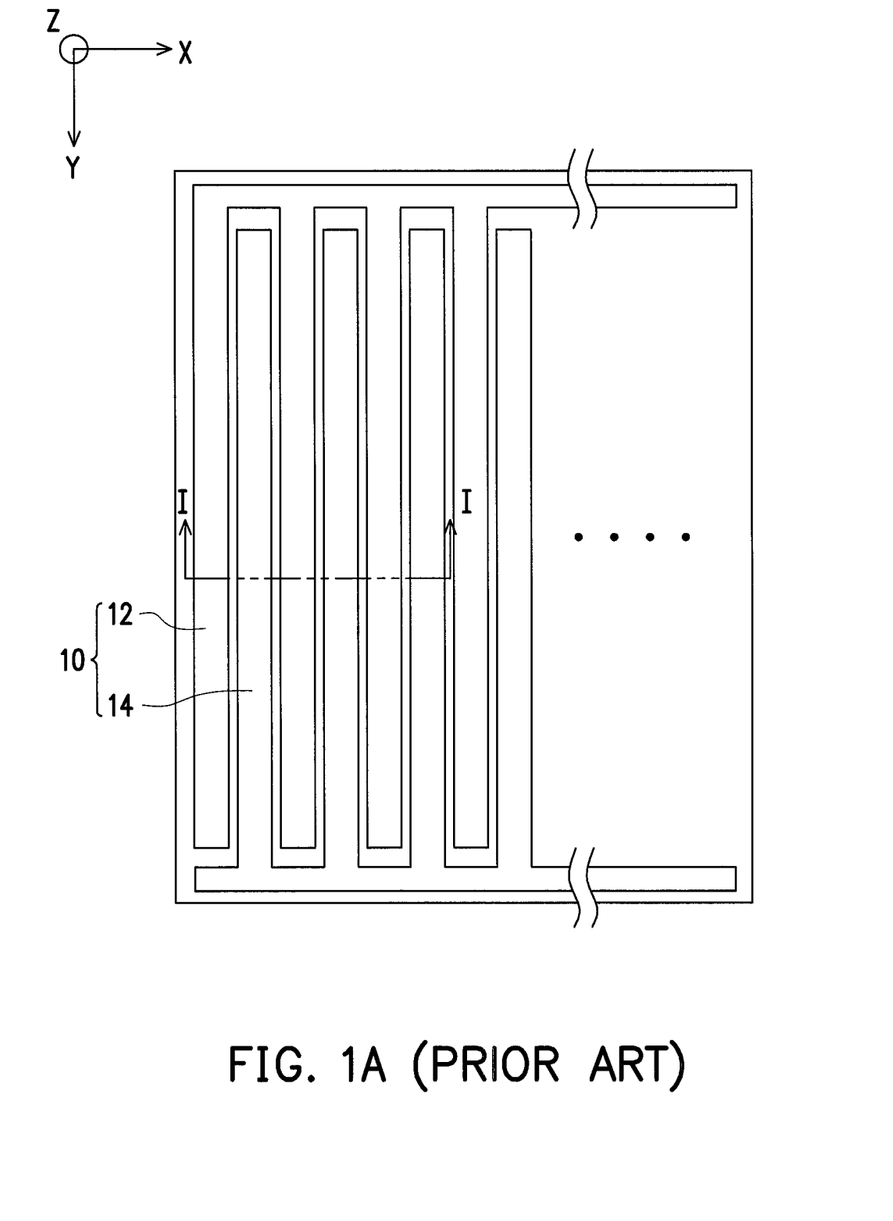
FIG. 1A is a schematic top view illustrating a first electrode structure of a conventional switchable parallel barrier.
Figure 1B:
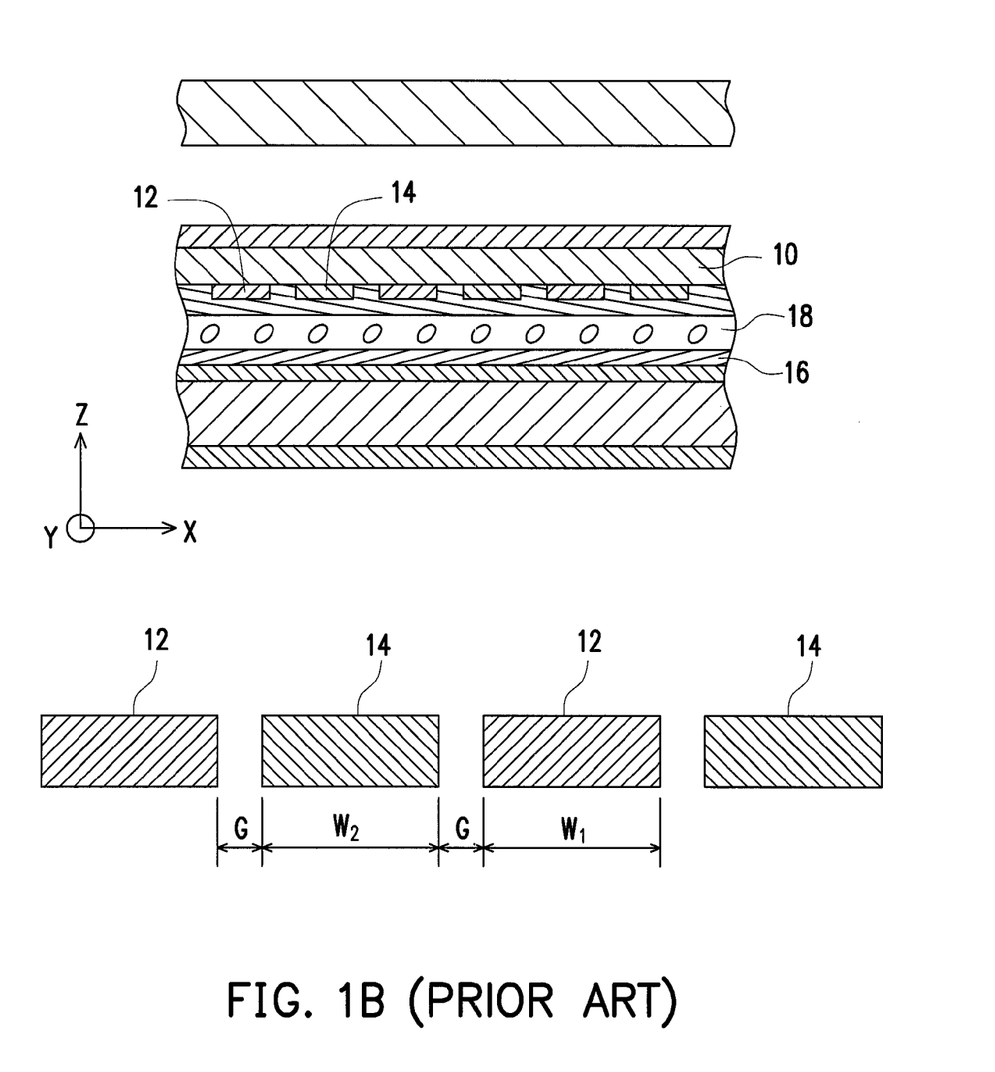
FIG. 1B is a schematic cross-sectional view taken along a line I-I depicted in FIG. 1A.

FIG. 1A is a schematic top view illustrating a first electrode structure of the conventional switchable parallel barrier. FIG. 1B is a schematic cross-sectional view taken along a line I-I depicted in FIG. 1A. With reference to FIG. 1A and FIG. 1B, the conventional switchable parallax barrier 10 includes a plurality of odd electrodes 12 electrically connected to one another, a plurality of even electrodes 14 electrically connected to one another, a scan electrode 16, and a liquid crystal layer 18. The odd electrodes 12 and the even electrodes 14 are coplanar and electrically insulated from one another. The scan electrode 16 is opposite to the odd electrodes 12 and the even electrodes 14. The liquid crystal layer 18 is located between the scan electrode 16 and the odd and even electrodes 12 and 14. The odd electrodes 12 and the even electrodes 14 are alternately arranged. The odd electrodes 12 electrically connected to one another constitute one finger-shaped pattern, and the even electrodes 14 electrically connected to one another constitute another finger-shaped pattern.

Since the odd electrodes 12 and the even electrodes 14 are coplanar, a gap G between each of the odd electrodes 12 and each of the even electrodes 14 is required, such that the odd electrodes 12 and the even electrodes 14 can be independently operated. As indicated in FIG. 1B, the barrier ratio of the switchable parallax barrier is calculated and represented by the equation: $W1/(G+W2+G+W1)=W2/(G+W1+G+W2)$.

Here, W1 denotes the width of each of the odd electrodes 12, W2 denotes the width of each of the even electrodes 14, and W1 is approximately equal to W2. Besides, G denotes the gap between each of the odd electrodes 12 and each of the even electrodes 14, and G is not equal to zero. Generally, given that the width of each of the odd electrodes 12 is equal to the width of each of the even electrodes 14 (i.e., W1=W2), and that the barrier ratio of the switchable parallax barrier 10 is approximately equal to 50%, the display having the switchable parallax barrier can achieve the most favorable display effects. However, it can be learned from the above-mentioned equation that the barrier ratio of the conventional switchable parallax barrier 10 is undoubtedly less than 50%. Therefore, the conventional switchable parallax barrier 10 is not very much likely to accomplish the expected 3D display effects.

SUMMARY

The invention is directed to a switchable 3D display characterized by favorable display quality.

In an embodiment of the invention, a switchable 3D display that includes a display device and a switchable parallax barrier is provided. The switchable parallax barrier is disposed on the display device. The switchable parallax barrier includes a first electrode structure, a second electrode structure, and a liquid crystal layer. The liquid crystal layer is located between the first electrode structure and the second electrode structure. The first electrode structure includes a planar electrode, a plurality of first bar electrodes electrically connected to one another, and an insulating layer. A partial region of the planar electrode is not covered by the first bar electrodes. The insulating layer is disposed between the planar electrode and the first bar electrodes, such that the planar electrode is electrically insulated from the first bar electrodes.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 2A:
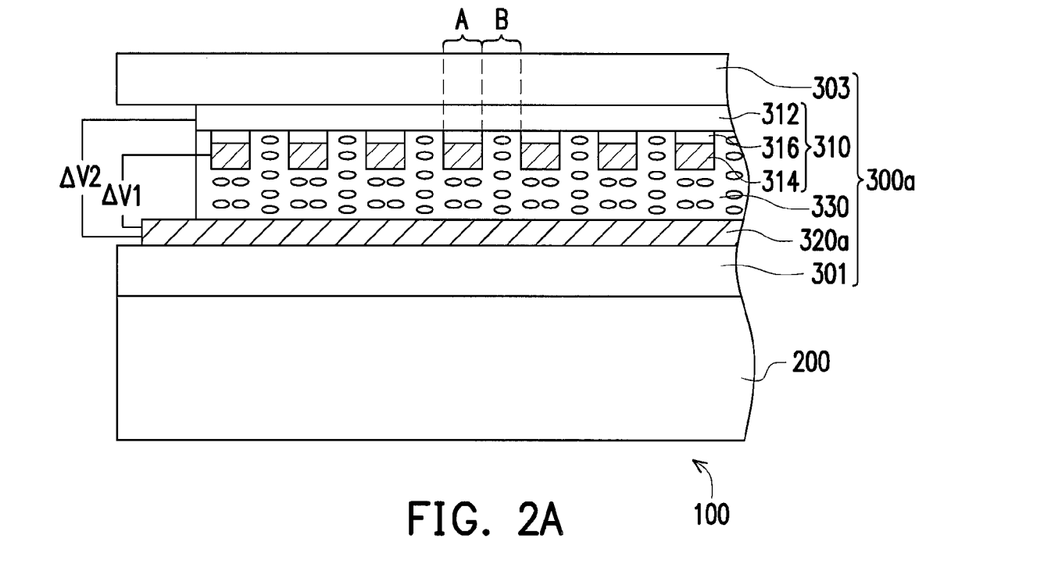
FIG. 2A is a schematic cross-sectional view illustrating a switchable 3D display according to an embodiment of the invention.
Figure 2B:
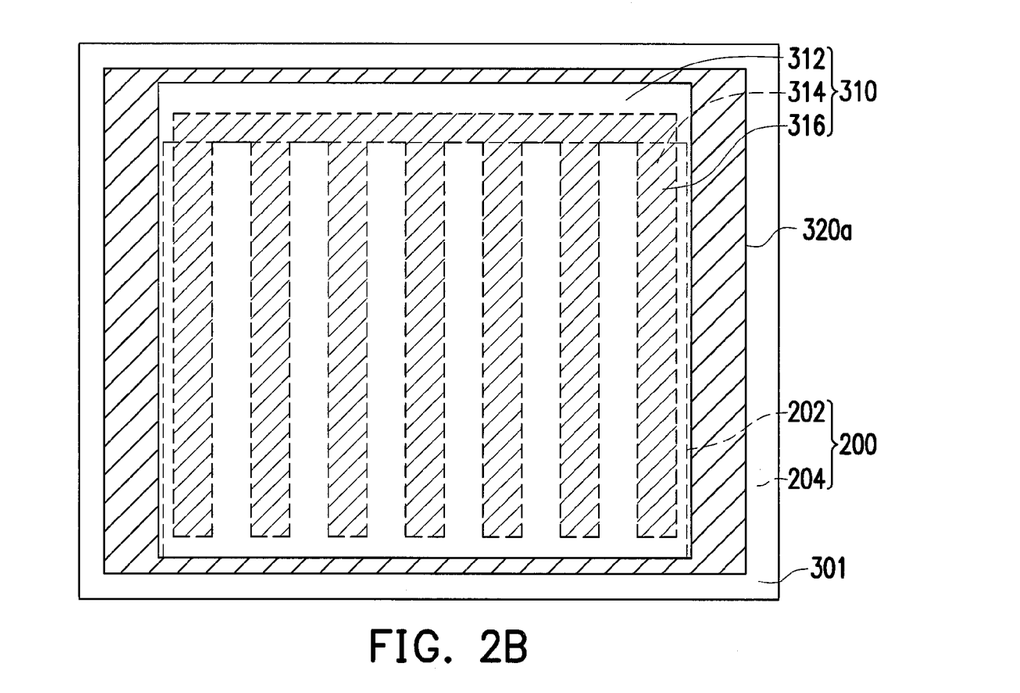
FIG. 2B is a schematic top view illustrating the switchable 3D display depicted in FIG. 2A.
Figure 2C:
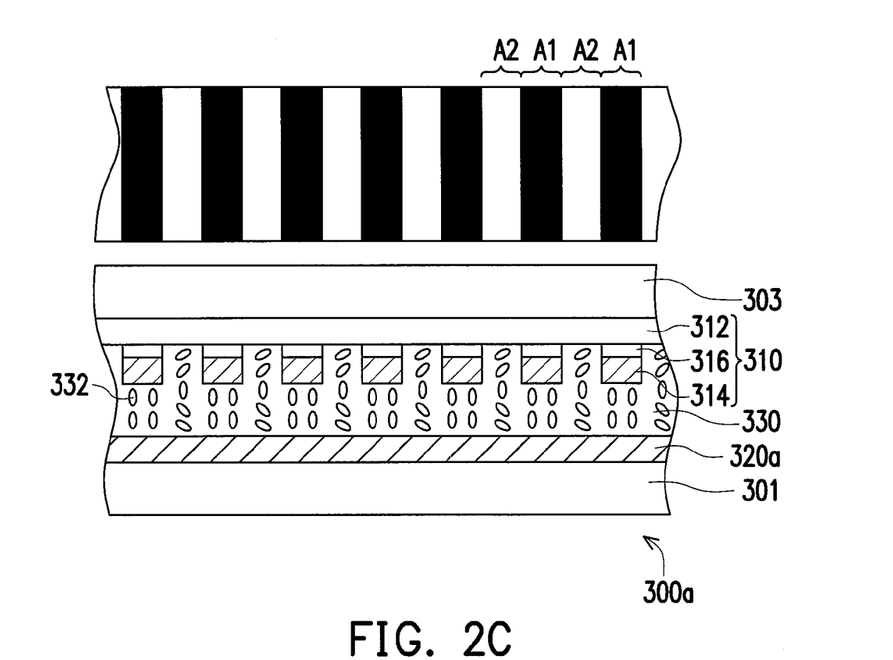
FIG. 2C is a schematic cross-sectional view illustrating the arrangement of liquid crystal molecules in the liquid crystal layer of the switchable parallax barrier of FIG. 2A when different voltage differences are given, and FIG. 2C' is a schematic view illustrating the corresponding phase change.

FIG. 2A is a schematic cross-sectional view illustrating a switchable 3D display according to an embodiment of the invention. FIG. 2B is a schematic top view illustrating the switchable 3D display depicted in FIG. 2A. FIG. 2C is a schematic cross-sectional view illustrating the arrangement of liquid crystal molecules in the liquid crystal layer of the switchable parallax barrier of FIG. 2A when different voltage differences are given, and FIG. 2C' is a schematic view illustrating the corresponding phase change. To better describe the invention, some elements shown in FIG. 2A are omitted in FIG. 2B.

With reference to FIG. 2A and FIG. 2B, the switchable 3D display 100 of this embodiment includes a display device 200 and a switchable parallax barrier 300a. The display device 200 is an LCD device, an OELD device, a plasma display device, an electrophoretic display device, or an electrowetting display device, for instance, which should not be construed as a limitation to the invention.

The switchable parallax barrier 300a of this embodiment is disposed on the display 200 and includes a first substrate 301, a second substrate 303 opposite to the first substrate 301, a first electrode structure 310, a second electrode structure 320a, and a liquid crystal layer 330. The first electrode structure 310, the second electrode structure 320a, and the liquid crystal layer 330 are located between the first substrate 301 and the second substrate 303. The liquid crystal layer 330 is located between the first electrode structure 310 and the second electrode structure 320a. The first electrode structure 310 includes a planar electrode 312, a plurality of first bar electrodes 314 electrically connected to one another, and an insulating layer 316. A partial region of the planar electrode 312 is not covered by the first bar electrodes 314. The insulating layer 316 is disposed between the planar electrode 312 and the first bar electrodes 314, such that the planar electrode 312 is electrically insulated from the first bar electrodes 314. Besides, the second electrode structure 320a is a planar electrode, for instance.

With reference to FIG. 2B, the display device 200 of this embodiment has a display region 202 and a peripheral region 204. The first bar electrodes 314 electrically connected to one another are distributed corresponding to the display region 202, and the first bar electrodes 314 are connected to one another at a place corresponding to the peripheral region 204. The first bar electrodes 314 electrically connected to one another constitute a finger-shaped pattern or a grid-shaped pattern. The first bar electrodes 314 that are electrically connected to one another and the insulating layer 316 can have the same pattern. Namely, the insulating layer 316 can have the finger-shaped pattern or the grid-shaped pattern.

Note that the configuration of the insulating layer 316 is not limited in the invention. Although the insulating layer 316 and the first bar electrodes 314 have the same pattern, the insulating layer 316 described in other embodiments can also be a planar insulating layer. Besides, the planar insulating layer covers the partial region of the planar electrode 312 that is not covered by the first bar electrodes 314. In brief, as long as the insulating layer 316 is designed to electrically insulate the planar electrode 312 from the first bar electrodes 316, the design of the insulating layer 316 falls within the scope of the invention.

In this embodiment, the first bar electrodes 314 in the first electrode structure 310 are stacked onto the planar electrode 312, and the insulating layer 316 is located between the first bar electrodes 314 and the planar electrode 312. Hence, there is no gap between the first bar electrodes 314 and the planar electrode 312 in a horizontal direction. That is to say, the first bar electrodes 314 and the partial region of the planar electrode 312 that is not covered by the first bar electrodes 314 can respectively define two phase regions A and B. There is barely any gap between the two phase regions A and B, and the width of each of the two phase regions A and B is substantially the same.

On the condition that the width of each of the two phase regions A and B is substantially the same, and that there is almost no gap between the two phase regions A and B (i.e., G=0), the calculated barrier ratio of the switchable parallax barrier 300a represented by the conventional equation is approximately equal to 50% in this embodiment. Therefore, compared to the conventional switchable parallax barrier in which the odd electrodes 12 and the even electrodes 14 are coplanar and have a gap G therebetween, as indicated in FIG. 1A and FIG. 1B, the switchable parallax barrier 300a of this embodiment has the barrier ratio that almost reaches 50%. In other words, the switchable 3D display 100 having the switchable parallax barrier 300a can have favorable display quality.

In this embodiment, when the switchable 3D display 100 is operated in a 3D display mode, the second electrode structure 320a and each of the first bar electrodes 314 have a first voltage difference $\Delta V1$ therebetween (i.e., the phase region A has the first voltage difference $\Delta V1$). The second electrode structure 320a and a partial region of the planar electrode 312 that is not covered by the first bar electrodes 314 have a second voltage difference $\Delta V2$ therebetween (i.e., the phase region B has the second voltage difference $\Delta V2$). The first voltage difference $\Delta V1$ is substantially different from the second voltage difference $\Delta V2$.

When the voltage applied to the phase region A and the voltage applied to the phase region B have a difference, the phase retardation of the liquid crystal layer 330 in the phase regions A and B can be changed. For instance, when the potential of the planar electrode 312 is equal to the potential of the second electrode structure 320a (i.e., the second voltage difference $\Delta V2$ is equal to zero), and the first bar electrodes 314 and the second electrode structure 320a have the first voltage difference $\Delta V1$ (not equal to zero) therebetween, the arrangement of the liquid crystal molecules 332 in the liquid crystal layer 330 in the switchable parallax barrier 300a and the distribution of the phase regions A and B (i.e., the light-shielding region A1 and the light-transmissive region A2) are shown in FIG. 2C. When the planar electrode 312 and the second electrode structure 320a have the second voltage difference $\Delta V2$ (not equal to zero) therebetween, and the potential of the first bar electrodes 314 is equal to the potential of the second electrode structure 320a (i.e., the first voltage difference $\Delta V1$ is equal to zero), the arrangement of the liquid crystal molecules 332 in the liquid crystal layer 330 in the switchable parallax barrier 300a and the distribution of the phase regions A and B (i.e., the light-shielding region A1 and the light-transmissive region A2) are shown in FIG. 2C'. It can be observed from FIG. 2C and FIG. 2C' that the area of the light-shielding region A1 is substantially the same as the area of the light-transmissive region A2. Namely, the barrier ratio of the switchable parallax barrier 300a is approximately equal to 50% in this embodiment. Thereby, the switchable parallax barrier 300a can effectively reduce the 3D cross talk, and thus the switchable 3D display 100 of this embodiment can have favorable display quality.

Further, the phase region A can be considered as a single-eye (left-eye or right-eye) region, and the phase region B can be considered as another single-eye (right-eye or left-eye) region. When a viewer observes the phase region A with his or her left eye and observes the phase region B with his or her right eye within one sub-frame period, and the viewer observes the phase region B with his or her left eye and observes the phase region A with his or her right eye within the next sub-frame period, the left-eye image and the right-eye image are determined to be a 3D vision by the viewer. Here, the two sub-frame periods are regarded as a frame period of the 3D image. At this time, the 3D image that is observed by the viewer has the same resolution as that of the display 200.

When the liquid crystal layer 330 is a normally white liquid crystal (LC) layer, and the switchable 3D display 100 is operated under a 2D display mode, the voltage difference between the second electrode structure 320a and each of the first bar electrodes 314 is equal to zero, and the voltage difference between the partial region of the planar electrode 312 and the second electrode structure 320a is equal to zero as well. In other words, there is no phase retardation between the phase regions A and B, and the phase regions A and B are light-transmissive regions. By contrast, when the liquid crystal layer 330 is a normally black liquid crystal (LC) layer, and the switchable 3D display 100 is operated under a 2D display mode, the voltage difference between the second electrode structure 320a and each of the first bar electrodes 314 is not equal to zero, and the voltage difference between the partial region of the planar electrode 312 and the second electrode structure 320a is not equal to zero. At this time, there is no phase retardation between the phase regions A and B, and the phase regions A and B are light-transmissive regions.

Figure 2D:
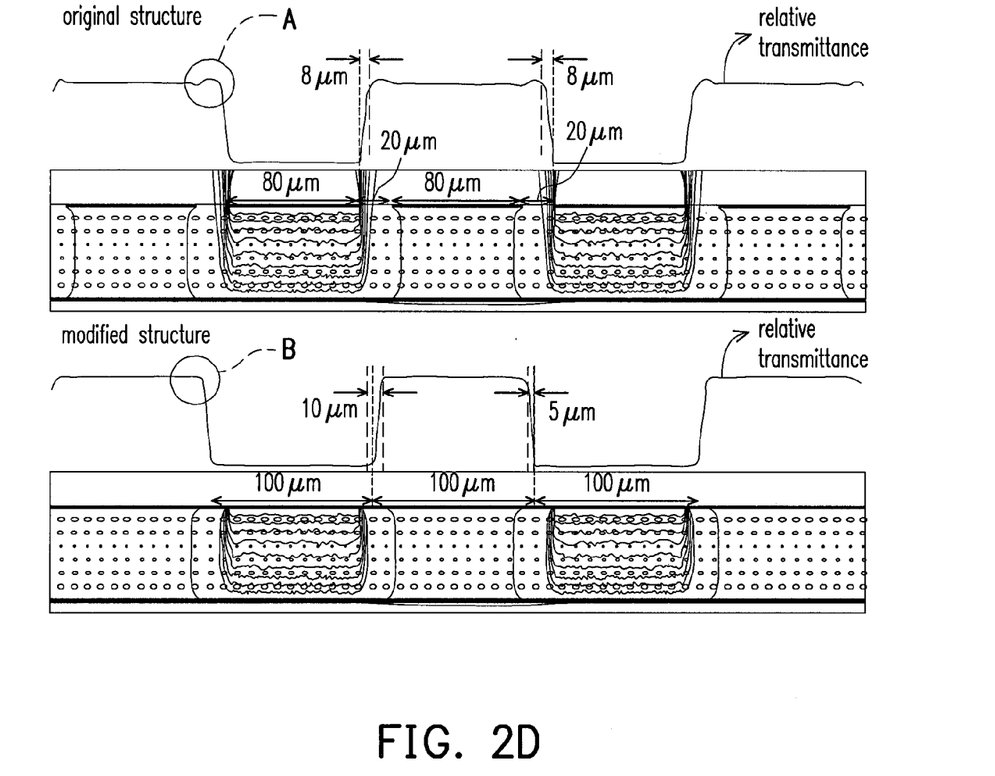
FIG. 2D is an analytic simulation diagram illustrating the comparison between the light transmission of the switchable 3D display of the invention and the light transmission of the conventional switchable 3D display.

FIG. 2D is an analytic simulation diagram illustrating the comparison between the light transmission of the switchable 3D display of the invention and the light transmission of the conventional switchable 3D display. With reference to FIG. 2D, there is a gap G between each of the odd electrodes 12 and each of the even electrodes 14, and the odd electrodes 12 and the even electrodes 14 are coplanar, as shown in FIG. 1A and FIG. 1B. Therefore, the light transmitted through the gap G is rather bright (as shown by the dotted circle A in the analytic simulation diagram). With reference to FIG. 2A, in this embodiment, the first bar electrodes 314 of the first electrode structure 310 are stacked onto the planar electrode 312, and the insulating layer 316 is located between the first bar electrodes 314 and the planar electrode 312. Hence, there is no gap between the first bar electrodes 314 and the planar electrode 312 in the horizontal direction, and the light at the dotted circle B has satisfactory transmission performance (i.e., the light at the dotted circle B is not overly bright). In brief, compared to the conventional switchable 3D display having the switchable parallax barrier in which the odd electrodes 12 and the even electrodes 14 are coplanar and have a gap G therebetween, the switchable 3D display 100 having the switchable parallax barrier of this invention can have favorable display quality.

The design of the second electrode structures 320b and 320c is elaborated with reference to two different embodiments below. The reference numbers and some of the descriptions in the previous embodiment are applicable in the following embodiments. The same components in the previous and following embodiments are denoted by the same numerals, and the same descriptions in the previous and following embodiments are not reiterated herein.

Figure 3:
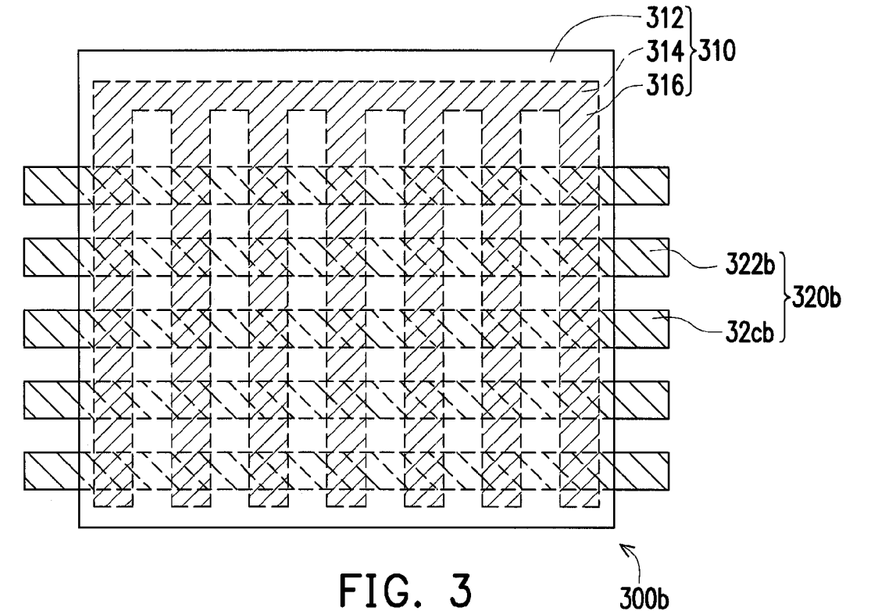
FIG. 3 is a schematic top view illustrating a first electrode structure and a second electrode structure of a switchable parallax barrier according to an embodiment of the invention.

FIG. 3 is a schematic top view illustrating a first electrode structure and a second electrode structure of a switchable parallax barrier according to an embodiment of the invention. With reference to FIG. 3, the difference between the switchable parallax barrier 300b of this embodiment and the switchable parallax barrier 300a of the previous embodiment mainly lies in that the second electrode structure 320b includes a plurality of second bar electrodes 322b electrically insulated from one another. The first bar electrodes 314 of the first electrode structure 310 are parallel to one another, the second bar electrodes 322b of the second electrode structure 320b are parallel to one another, and an extension direction of each of the first bar electrodes 314 is substantially perpendicular to an extension direction of each of the second bar electrodes 322b.

Figure 4:
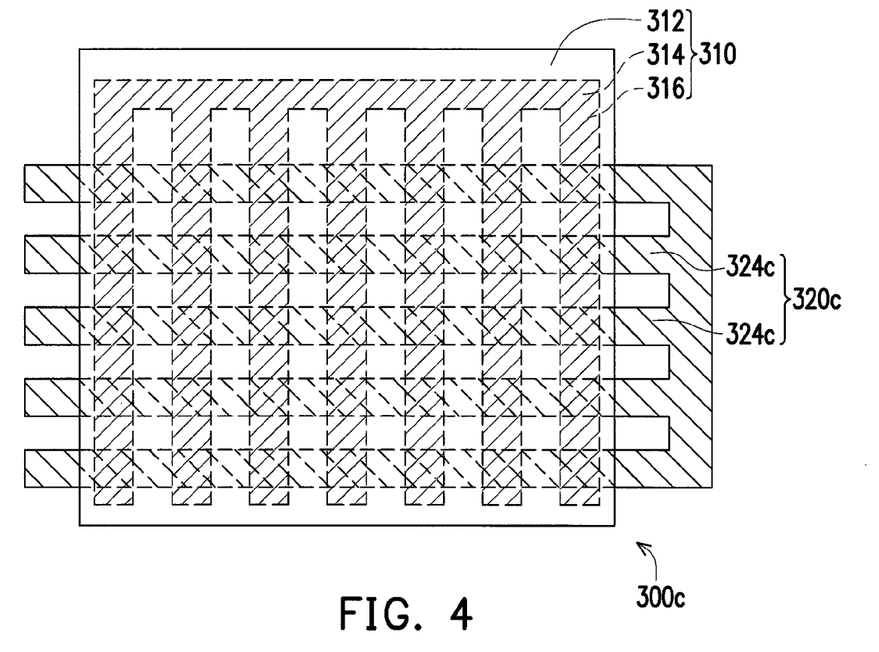
FIG. 4 is a schematic top view illustrating a first electrode structure and a second electrode structure of a switchable parallax barrier according to another embodiment of the invention.

FIG. 4 is a schematic top view illustrating a first electrode structure and a second electrode structure of a switchable parallax barrier according to another embodiment of the invention. With reference to FIG. 4, the difference between the switchable parallax barrier 300c of this embodiment and the switchable parallax barrier 300a of the previous embodiment mainly lies in that the second electrode structure 320c includes a plurality of third bar electrodes 324c connected to one another. The first bar electrodes 314 of the first electrode structure 310 are parallel to one another, the third bar electrodes 324c of the second electrode structure 320c are parallel to one another, and an extension direction of each of the first bar electrodes 314 is substantially perpendicular to an extension direction of each of the third bar electrodes 324c.

In light of the foregoing, the first bar electrodes in the first electrode structure are vertically stacked onto the planar electrode, and the insulating layer is located between the first bar electrodes and the planar electrode. Hence, there is no gap between the first bar electrodes and the planar electrode in a horizontal direction. Compared to the conventional switchable 3D display having the switchable parallax barrier in which the odd electrodes and the even electrodes are coplanar and have a gap therebetween, the switchable 3D display having the switchable parallax barrier of this invention can have favorable display quality. Moreover, since there is no gap between the first bar electrodes and the planar electrode in the horizontal direction, the barrier ratio of the switchable parallax barrier is approximately equal to 50%. Thereby, the 3D cross talk can be effectively reduced, and the switchable 3D display described in the embodiments of the invention can have favorable optical performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A switchable three-dimensional display, comprising:
a display device; and
a switchable parallax barrier disposed on the display device, the switchable parallax barrier comprising a first electrode structure, a second electrode structure, and a liquid crystal layer located between the first electrode structure and the second electrode structure, wherein the first electrode structure includes a planar electrode, a plurality of first bar electrodes electrically connected to one another, and an insulating layer, a partial region of the planar electrode is not covered by the first bar electrodes, and the insulating layer is located between the planar electrode and the first bar electrodes, such that the planar electrode is electrically insulated from the first bar electrodes, wherein an orthogonal projection of the first bar electrodes on the planar electrode completely overlaps with the planar electrode, and the first bar electrodes connected to one another and the insulating layer have a same pattern.

2. The switchable three-dimensional display as recited in claim 1, wherein the display device comprises a liquid crystal display device, an organic electro-luminescent display device, a plasma display device, an electrophoretic display device, or an electrowetting display device.

3. The switchable three-dimensional display as recited in claim 1, wherein the display device has a display region and a peripheral region, the first bar electrodes electrically connected to one another are distributed corresponding to the display region, and the first bar electrodes are connected to one another at a place corresponding to the peripheral region.

4. The switchable three-dimensional display as recited in claim 1, wherein the first bar electrodes electrically connected to one another constitute a finger-shaped pattern or a grid-shaped pattern.

5. The switchable three-dimensional display as recited in claim 1, wherein the insulating layer is a planar insulating layer, and the planar insulating layer covers the partial region of the planar electrode not covered by the first bar electrodes.

6. The switchable three-dimensional display as recited in claim 1, wherein the second electrode structure is a planar electrode.

7. The switchable three-dimensional display as recited in claim 1, wherein the second electrode structure comprises a plurality of second bar electrodes electrically insulated from one another.

8. The switchable three-dimensional display as recited in claim 7, wherein the first bar electrodes are parallel to one another, the second bar electrodes are parallel to one another, and an extension direction of each of the first bar electrodes is substantially perpendicular to an extension direction of each of the second bar electrodes.

9. The switchable three-dimensional display as recited in claim 1, wherein the second electrode structure comprises a plurality of third bar electrodes connected to one another.

10. The switchable three-dimensional display as recited in claim 9, wherein the first bar electrodes are parallel to one another, the third bar electrodes are parallel to one another, and an extension direction of each of the first bar electrodes is substantially perpendicular to an extension direction of each of the third bar electrodes.

11. The switchable three-dimensional display as recited in claim 1, wherein the second electrode structure and each of the first bar electrodes have a first voltage difference therebetween, the partial region of the planar electrode and the second electrode structure have a second voltage difference therebetween, and the first voltage difference is different from the second voltage difference.

12. A switchable three-dimensional display, comprising:
a display device; and
a switchable parallax barrier disposed on the display device, the switchable parallax barrier comprising a first electrode structure, a second electrode structure, and a liquid crystal layer located between the first electrode structure and the second electrode structure, wherein the first electrode structure includes a planar electrode, a plurality of first bar electrodes electrically connected to one another, and an insulating layer, a partial region of the planar electrode is not covered by the first bar electrodes, and the insulating layer is located between the planar electrode and the first bar electrodes, such that the planar electrode is electrically insulated from the first bar electrodes;
wherein the second electrode structure and each of the first bar electrodes have a first voltage difference therebetween, the partial region of the planar electrode and the second electrode structure have a second voltage difference therebetween, the first voltage difference is different from the second voltage difference, and the first bar electrodes connected to one another and the insulating layer have a same pattern.

13. The switchable three-dimensional display as recited in claim 12, wherein the second electrode structure comprises a plurality of second bar electrodes electrically insulated from one another.

14. The switchable three-dimensional display as recited in claim 13, wherein the first bar electrodes are parallel to one another, the second bar electrodes are parallel to one another, and an extension direction of each of the first bar electrodes is substantially perpendicular to an extension direction of each of the second bar electrodes.

15. The switchable three-dimensional display as recited in claim 12, wherein the second electrode structure comprises a plurality of third bar electrodes connected to one another.

16. The switchable three-dimensional display as recited in claim 15, wherein the first bar electrodes are parallel to one another, the third bar electrodes are parallel to one another, and an extension direction of each of the first bar electrodes is substantially perpendicular to an extension direction of each of the third bar electrodes.

17. A switchable three-dimensional display, comprising:
a display device; and
a switchable parallax barrier disposed on the display device, the switchable parallax barrier comprising a first electrode structure, a second electrode structure, and a liquid crystal layer located between the first electrode structure and the second electrode structure, wherein the first electrode structure includes a planar electrode, a plurality of first bar electrodes electrically connected to one another, and an insulating layer, a partial region of the planar electrode is not covered by the first bar electrodes, and the insulating layer is located between the planar electrode and the first bar electrodes, such that the planar electrode is electrically insulated from the first bar electrodes;
wherein the second electrode structure comprises a plurality of third bar electrodes connected to one another, and the first bar electrodes connected to one another and the insulating layer have a same pattern.

18. The switchable three-dimensional display as recited in claim 17, wherein the first bar electrodes are parallel to one another, the third bar electrodes are parallel to one another, and an extension direction of each of the first bar electrodes is substantially perpendicular to an extension direction of each of the third bar electrodes.

* * * * *